Patented Oct. 3, 1922.

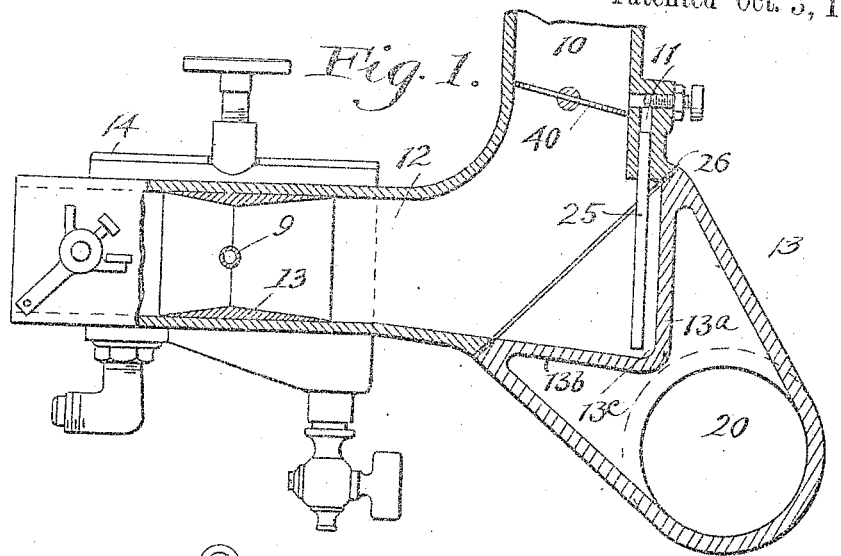
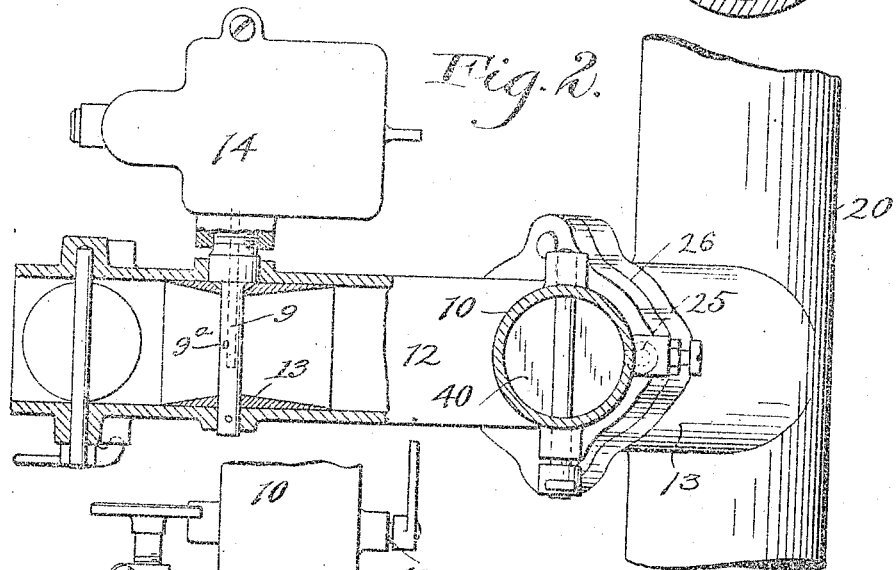
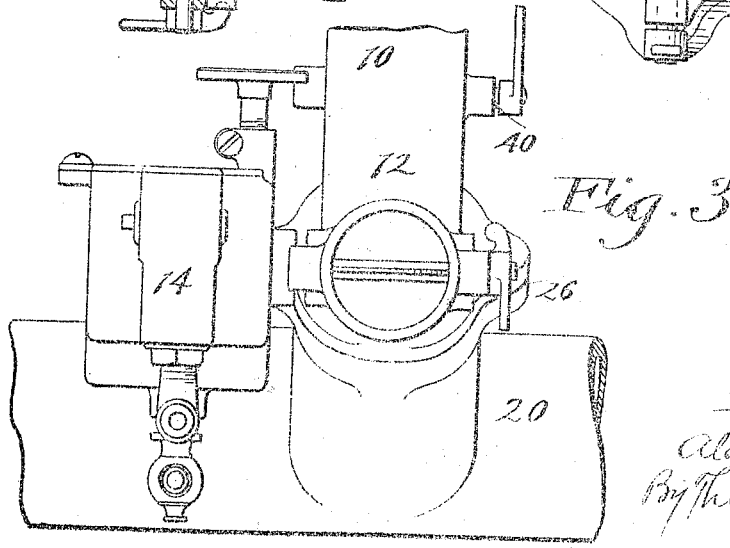

1,430,792

UNITED STATES PATENT OFFICE.

ALANSON P. BRUSH, OF DETROIT, MICHIGAN.

CHARGE-PRODUCING DEVICE FOR INTERNAL-COMBUSTION ENGINES.

Application filed January 5, 1917. Serial No. 140,672.

*To all whom it may concern:*

Be it known that I, ALANSON P. BRUSH, a citizen of the United States, residing at Detroit, in the county of Wayne and State of Michigan, have invented a certain new and useful Improvement in Charge-Producing Devices for Internal-Combustion Engines, of which the following is a full, clear, and exact description.

The object of this invention is to insure the complete vaporization of the liquid spray particles of fuel in a charge mixture produced in a carbureter which is arranged below the charge mixture distributing passages of the associated internal combustion engine; and from which, therefore, the charge mixture must be conveyed upward through a suitable conduit to such charge mixture distributing passages.

More especially, the object is to provide means by which said spray particles will be heated enough to vaporize them, and without substantially heating the remainder of the charge mixture.

Another object is to cheaply adapt this invention to conventional constructions.

In the drawing, Fig. 1 is a vertical central section through the carbureter and the L-shaped tube by which the charge mixture formed in the carbureter is conveyed to the charge mixture distributing passage ports of the engine; Fig. 2 is a plan view of the same with the horizontal part of the L-shaped tube shown partly in section, and Fig. 3 is a side view from the left side of Fig. 1.

Referring to the parts by reference characters, 10 represents the vertical branch and 12 the horizontal branch of an L-shaped tube. The vertical branch may be of any desired length and is intended to be suitably connected with the charge mixture distributing passages of the associated internal combustion engine. The horizontal branch is open at its end for the admission of air which will be drawn into the same on the suction strokes of the engine. A nozzle tube 9 extends across this horizontal branch, and in a part 13 thereof which is interiorly of venturi shape; and this nozzle tube has a jet opening 9ª through which fuel will be drawn into the air stream which is flowing through said L-shaped tube, thereby forming the charge mixture. The part of the horizontal branch which is venturi shape and which contains the nozzle forms a carbureter of conventional type.

Whether the remainder of the horizontal branch and a part of the vertical branch of the L-shaped tube shall be regarded as a part of the carbureter or a part of the inlet conduit of the engine seems to be a matter of words. I prefer to assume that the carbureter constitutes only a part of the horizontal branch as stated, and that the remainder of said horizontal branch and the vertical branch are parts of the inlet conduit of the engine, because they are parts of the passageway through which the charge mixture, formed in the carbureter, as above defined, by the delivery of fuel spray into the air stream, is carried to the charge mixture distributing passages of the engine. With this understanding of the intended definition of the words used, a further description of the device will be proceeded with.

The outer corner of the juncture between the horizontal and vertical branches of the L-shaped tube is cut away, and over the hole so produced is fastened a part of the exhaust conduit 20 of the engine. Part of the wall of said exhaust conduit which is so secured over this hole forms a partition wall between the exhaust conduit and said L-shaped tube, and extends beneath the lower end of the vertical branch and across the horizontal branch to form an end or closure therefor.

In the specific construction shown this partition wall has a substantially horizontal portion 13ᵇ and a substantially vertical portion 13ª, said horizontal portion being a practically flush continuation of the lower wall of the horizontal branch of said tube. The inner corner of the juncture between the vertical and horizontal branches is curved as shown; wherefore the cross sectional area of this gas passageway at the bend or juncture between the vertical and horizontal branches is considerably larger than the cross sectional area of the carbureter or part of the horizontal tube adjacent thereto. The vertical wall 13ª and the horizontal wall 13ᵇ serve as a partition between a part of the exhaust conduit and said L-shaped tube, and therefore this partition wall will be heated by the exhaust gas as it passes out. It will be noted that the vertical partition 13ª extends up to a point slightly above the top wall of the horizontal branch and therefore extends entirely across the end of the horizontal branch of said L-shaped tube, and forms a closure or end therefor. The charge mixture, including the air and fuel spray formed in the carbureter, will flow in a straight path toward this vertical partition 13ª. The spray particles are heavier than the air. Therefore their inertia will tend to carry them in the straight path and cause them to impinge against the hot wall 13ª; and this will result in their being so heated that they will vaporize. The already gaseous part of the charge mixture, i. e., the air and vaporized fuel, will, however, be deflected around the bend and upward into the vertical branch 10, and very little of it will come in contact with the hot wall 13ª or the hot bottom wall 13ᵇ. The fact that this L-shaped tube is of larger diameter in that part thereof which has the partitions 13ª and 13ᵇ as a part of its wall than the horizontal adjacent part of the tube, will cause a sudden reduction in the velocity of this gaseous part of the charge mixture. This sudden reduction in velocity will largely deprive the stream of its power to deflect the heavier spray particles, and will leave them substantially free to obey the law which carries them forward in a straight path, wherefore they will impinge against the hot plate 13ª as above stated. If any of these spray particles are influenced by gravity and fall out of the moving air stream they will fall down upon the hot substantially horizontal plate 13ᵇ, and will be thereby vaporized; or if any of these particles are deflected into the vertical branch of this tube and condense upon its wall they will flow by gravity downward, and will either flow down onto the vertical hot wall 13ª or drop upon the horizontal hot wall 13ᵇ and be thereby vaporized.

Therefore these hot walls 13ª, 13ᵇ, will serve to heat and vaporize substantially all of the spray particles of fuel contained in the charge mixture, but they will not much heat any other part of the charge mixture.

In order to prevent the spread of heat from the walls 13ª, 13ᵇ, to the adjacent parts of the walls of the air tube, said walls 13ª and 13ᵇ are heat insulated from the latter. This heat insulation may grow out of the mere fact that there is a joint between them and the L-shaped tube, although it will be produced in a higher and more satisfactory degree by including between those parts a gasket 26 of asbestos or some other heat non-conducting material.

It will be noted that the shape of the horizontal tube in the part thereof formed by the wall 13ᵇ is not exactly horizontal, but inclines downward to a point of juncture between the walls 13ª, 13ᵇ, thereby forming a shallow pocket 13ᶜ. This particular feature of construction is of value in connection with the starting of the engine before the exhaust gases have heated the walls 13ª, 13ᵇ. In that event there will be some condensation of the liquid fuel in this pocket. To utilize this a small pipe 25, open at its lower end, projects into this pocket. Its upper end is connected in a duct 11 in a wall of the vertical branch 10, which duct discharges into said vertical branch just above the throttle valve 40 therein. When, therefore, the throttle is nearly closed, as it will be when the engine is being started, there will be a high velocity of the air adjacent the throttle valve and duct 11. There will, therefore, be such a low pressure adjacent the discharge end of the duct 11 that the fuel in pocket 13ᶜ will be sucked up through pipe 25, and discharged into the high velocity air stream, thereby producing for the time being a very rich mixture which facilitates the starting of the engine.

By calling attention to the fact that in the specified embodiment of the invention shown in the drawing the hot walls 13ª and 13ᵇ, which form the outside angle of the juncture between the vertical and horizontal tubes, are insulated from the adjacent walls of the mixture conduit, and that certain advantages are believed to result from this, it is not and has not been my intention to limit the scope of the claims to this specific feature of constructon unless such limitation is plainly expressed.

Having described my invention, what I claim is:

1. A charge mixture producing device for an internal combustion engine comprising, in combination, an L-shaped tube having an upwardly extended substantially vertical branch for carrying the charge mixture to the inlet passage of the engine, and a substantially horizontal branch which is open at one end and is in unobstructed communication at its other end with the lower end of said vertical branch, a carbureter which is connected with said horizontal branch, and an exhaust conduit, there being a partition wall which forms a part of the exhaust conduit and a part of the L-shaped tube and is extended across and forms the end wall of the horizontal branch and is also extended beneath the lower end of the vertical branch.

2. A charge mixture producing device for internal combustion engines comprising, in combination, an L-shaped tube having an upwardly extended substantially vertical branch for carrying the charge mixture to the inlet passage of the engine, and a substantially horizontal branch which is open at one end and is in unobstructed communication at its other end with the lower end of said vertical branch, a fuel nozzle which is connected with the source of fuel supply and which discharges into said horizontal branch, and the exhaust conduit of the engine, there being a partition wall between the exhaust conduit and the L-shaped tube which partition wall extends below the lower end of the vertical branch and across the horizontal branch to close the end thereof.

3. In a charge producing device for internal combustion engines, the combination of an L-shaped tube having a substantially horizontal branch, and a substantially vertical branch for carrying the charge mixture to the gas passages of an internal combustion engine, which L-shaped tube has its outer corner cut away, a carbureter connected with and discharging into the horizontal branch of said tube in the direction of the length thereof and toward the hereinafter mentioned vertical wall which extends across and forms the end of the horizontal branch of said L-shaped tube, the exhaust conduit of the associated engine, which conduit is connected with said L-shaped tube to close the opening at the outer corner thereof, said exhaust conduit having a substantially vertical wall which extends across and forms the end of the horizontal branch of said L-shaped tube, and a substantially horizontal wall which is a substantial continuation of the lower wall of the horizontal branch of said tube and forms the lower end of the vertical branch of said tube.

4. In a charge producing device for internal combustion engines, the combination of an L-shaped tube having a substantially horizontal branch, and a substantially vertical branch for carrying the charge mixture to the gas passages of an internal combustion engine, which L-shaped tube has its outer corner cut away, a carbureter connected with and discharging into the horizontal branch of said tube in the direction of the length thereof and directed toward the vertical wall which is a part of the exhaust manifold and which extends across and forms the end of the horizontal branch of the L-shaped tube, the exhaust conduit of the associated engine, which conduit is connected with said L-shaped tube to close the opening at the outer corner thereof, said exhaust conduit having a substantially vertical wall which extends across and forms the end of the horizontal branch of said L-shaped tube, and a substantially horizontal wall which is a substantial continuation of the lower wall of the horizontal branch of said tube and forms the lower end of the vertical branch of said tube, and a gasket of insulating material interposed between said L-shaped tube and exhaust conduit to prevent the spread of heat from the latter to the former.

5. In a charge producing device for internal combustion engines, the combination of an L-shaped tube having a straight substantially horizontal branch and a substantially vertical branch for carrying the charge mixture to the gas passages of an internal combustion engine, which L-shaped tube is formed without an outside corner at the juncture of its vertical and horizontal branches, and an exhaust conduit secured to said L-shaped tube and having part of its wall formed to fit and close the open corner thereof.

6. In a charge producing device for internal combustion engines, the combination of an L-shaped tube having a straight substantially horizontal branch and a substantially vertical branch for carrying the charge mixture to the inlet passages of an internal combustion engine, which tube is formed without an outside corner at the juncture of its vertical and horizontal branches, a carbureter connected with the horizontal branch of said L-shaped tube, an exhaust conduit which is separably connected with said tube over the open corner thereof and has a vertical wall which is located at that end of said horizontal tube toward which the carbureter products flow and which serves as a partition between the said tube and exhaust conduit, and having an approximately horizontal but slightly inclined wall which is a flush continuation of the lower wall of said horizontal branch and which is integral with the said vertical wall of said exhaust conduit and inclines downwardly toward the same, a throttle valve located in the vertical branch of the L-shaped tube, and a small tube which at its lower end projects into the pocket at the juncture of the vertical and downwardly inclined wall of the exhaust conduit and at its upper end communicates with the vertical branch of the L-shaped tube above the throttle valve.

7. In a charge producing device for internal combustion engines, the combination of an L-shaped tube having an upwardly extending charge delivering branch adapted for connection with the gas passages of the engine, and a straight charge mixture forming branch which extends in a direction substantially at right angles to the charge delivering branch,—the external angle at the junction of these two branches being substantially a right angle, and the internal wall at said junction being in the form of a wide curve, whereby the cross sectional area of the tube at said juncture is increased as compared with the cross sectional area of the adjacent part of the charge forming branch, means whereby exhaust gas from the engine is caused to contact with and heat those parts of the wall of said tube which constitutes the outside angle of said juncture and extend across the end of the charge forming branch and below and across the lower end of the charge delivering branch,— the charge forming branch having an air inlet, and means located between said air inlet and said juncture of the two branches for delivering fuel into the said charge forming branch.

8. In a charge producing device for internal combustion engines, the combination of an L-shaped tube having a substantially vertical branch for carrying the charge mixture to the inlet passages of an internal combustion engine and a substantially straight horizontal branch, a carbureter which is connected with said horizontal branch and has a fuel discharge jet opening located substantially axially in said horizontal branch, the outside corner of said tube at the junction of its vertical and horizontal branches being formed of a wall which extends beneath and forms the bottom of the lower end of the vertical branch, and extends across and forms the end of the horizontal branch, and an exhaust conduit of which said wall is a part.

9. In a charge producing device for internal combustion engines, the combination of an L-shaped tube having a substantially vertical branch for carrying the charge mixture to the inlet passages of an internal combustion engine and a substantially straight horizontal charge mixture forming branch, the exhaust conduit of said engine,—there being a partition wall between the exhaust conduit and said L-shaped tube forming a part of the L-shaped tube and a part of the exhaust conduit, which partition wall extends across and forms the end of the horizontal branch and also extends beneath and forms the bottom of the vertical branch of said L-shaped tube, and a carbureter connected with the other end of said horizontal branch and having a fuel discharge jet opening which is located substantially axially within said horizontal branch.

10. In a charge producing device for internal combustion engines, the combination of an L-shaped tube having a substantially vertical branch for carrying the charge mixture to the inlet passages of an internal combustion engine and a substantially straight horizontal charge mixture forming branch, the exhaust conduit of said engine,—there being a partition wall between the exhaust conduit and said L-shaped tube forming a part of the L-shaped tube and a part of said exhaust conduit, which partition wall extends across and forms the end of the horizontal branch and also extends beneath and forms the bottom of the vertical branch of said L-shaped tube, a carbureter connected with the other end of said horizontal branch and having a fuel discharge jet opening located substantially axially within said horizontal branch, and a throttle valve located in said vertical branch.

In testimony whereof, I hereunto affix my signature in the presence of two witnesses.

ALANSON P. BRUSH.

Witnesses:
OWEN M. NACKER,
THEODORE W. MARSH.